Sept. 19, 1933.   G. R. MONKS   1,927,243
PIN SAFETY CATCH
Filed Dec. 8, 1931
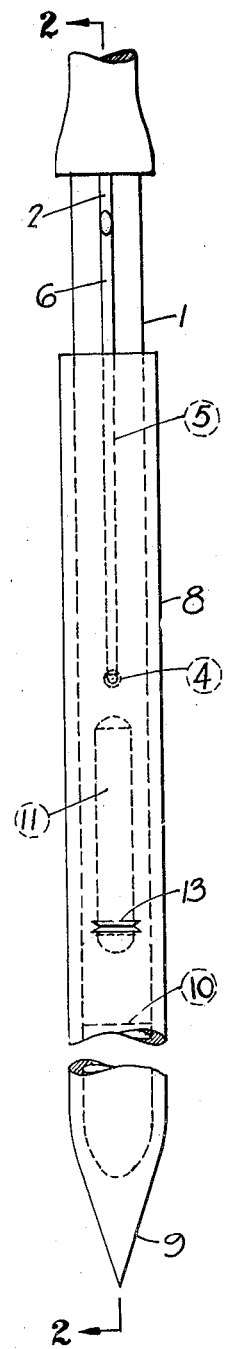
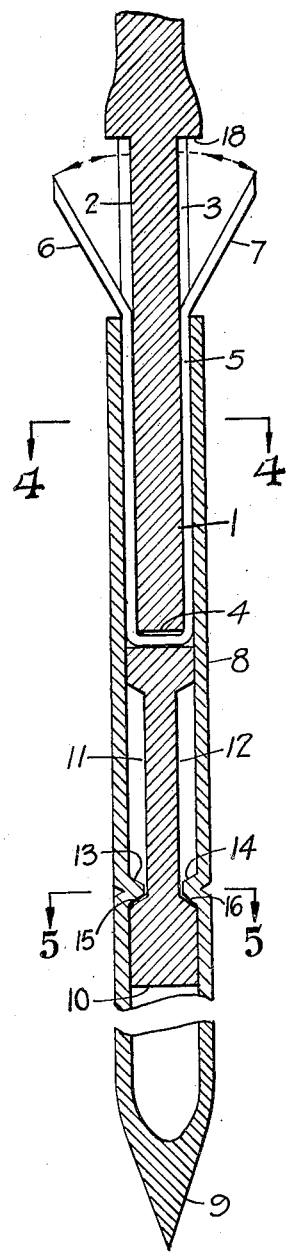
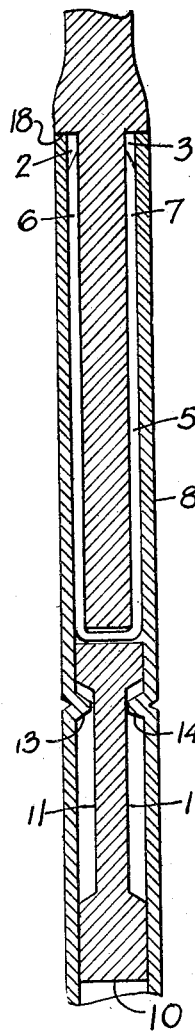
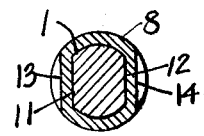
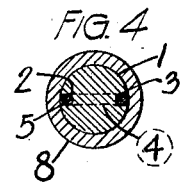
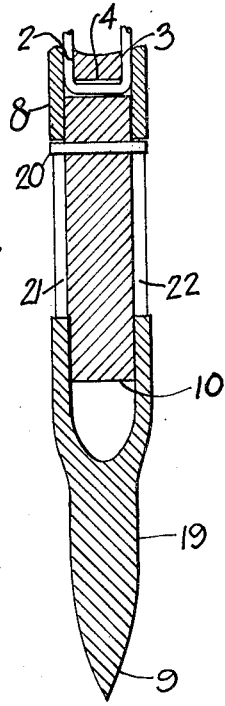
GEORGE RODNEY MONKS
INVENTOR
BY HIS ATTORNEYS:

Patented Sept. 19, 1933

1,927,243

UNITED STATES PATENT OFFICE 1,927,243

PIN SAFETY CATCH

George Rodney Monks, San Francisco, Calif.

Application December 8, 1931. Serial No. 579,793

4 Claims. (Cl. 24—155)

My invention relates to improvements in pin safety catches, and it consists of the combinations, constructions and arrangements hereinafter described and claimed.

An object of my invention is to provide a pin safety catch for preventing the loss of articles to which the safety catch is secured; as, for example, stick pins, brooches, etc. The device, when in closed position, occupies no more space than the diameter of a stick pin. When the device is in operative position, two spring legs are projected laterally from the pin, and these legs will engage with the fabric for preventing the loss of the article.

A further object of my invention is to provide a device of the type described, which is extremely simple in construction, and which is durable and efficient for the purpose intended.

Other objects and advantages will appear in the following specification, and the novel features of the device will be particularly pointed out in the appended claims.

My invention is illustrated in the accompanying drawing forming a part of this application, in which Figure 1 is a side elevation of the device;

Figure 2 is a section along the line 2—2 of Figure 1;

Figure 3 is similar to Figure 2, but shows the parts in closed position;

Figures 4 and 5 are sections along the lines 4—4 and 5—5 of Figure 2; and

Figure 6 is a sectional view of a modified form.

In carrying out my invention, I make use of a stick pin 1, and in this pin I provide two grooves 2 and 3.

The grooves are diametrically opposed, and extend along the length of the pin. All of the figures are greatly enlarged in order to clearly show the operating parts. In reality, the pin 1 has a diameter equal to a standard pin used for securing ornaments of dress to fabric. An opening 4 connects the grooves 2 and 3 together and forms a U-shaped recess. A U-shaped spring 5 is placed in the U-shaped recess and has bent portions 6 and 7, constituting legs that tend to swing into the full-line position, shown in Figure 2, when freed.

A sleeve 8 is slidably mounted on the pin 1 and is provided with a pointed closed end 9 that covers the blunt end 10 of the pin 1. The pin has flattened portions 11 and 12, and the sleeve 8 is crimped at 13 and 14 to slide over the flattened surfaces. Shoulders 15 and 16 engage with the crimped portions 13 and 14 and prevent the sleeve 8 from being removed. A stop 18, in the form of a raised shoulder on the pin 1, prevents movement of the sleeve 8 beyond a predetermined position.

From the foregoing description of the various parts of the device, the operation thereof may be readily understood.

When the pin 1 is to be projected through cloth, the sleeve 8 is moved into abutting position with respect to the stop 18, and this movement will cause the spring legs 6 and 7 to be swung into the full-line position shown in Figure 3. The spring 5 will now be completely housed, and the pin can be forced into the fabric in the usual way. In puncturing the fabric, the pointed end 9 of the sleeve 8 takes the place of the usual pointed end of the pin.

After the pin has been moved into the desired position, the sleeve 8 is moved away from the stop 18, and, immediately, the spring legs 6 and 7 will swing into the position shown in Figure 2.

The spring legs 6 and 7 act as anchors and engage with the fabric to prevent the accidental withdrawal of the pin. In this way, the article to which the pin is attached is secured against loss.

If the person wishes to withdraw the pin from the fabric, he first moves the sleeve 8 so as to enclose the spring legs 6 and 7, and then the pin can be withdrawn. The parts are small in structure, and the outer diameter of the sleeve 8 occupies no more space than the outer diameter of a standard stick pin.

In Figure 6, I show a slightly-modified form of the invention, this form being identical to that already described, except that the sleeve 8 is provided with a reduced portion 19 before it is shaped into the point 9. This construction gives a more slender appearance to the device, and the sleeve will enter the fabric more easily when provided with the reduced portion.

I also make use of a stop pin 20, which takes the place of the crimped portions 13 and 14 and slides in slots 21 and 22 in the sleeve 8. The stop pin 20 is carried by the pin 1 and prevents the removal of the sleeve 8 from the pin 1.

While I have shown only the preferred form of my invention, it should be understood that various changes or modifications may be made within the scope of the appended claims without departing from the spirit of the invention.

I claim:

1. A pin safety catch comprising a pin having spring arms extending in the direction of its length, means for normally holding the arms in contact with the pin, said means being movable for freeing the arms, the arms extending outwardly at an angle when freed and acting as anchoring means.

2. A pin safety catch comprising a pin having diametrically-opposed and longitudinally-extending recesses with a bore connecting the ends of the recesses for forming a U-shaped recess, a U-shaped spring placed in the recess and having its legs bent for extending at an angle to the pin when the legs are freed, and a sleeve slidable on the pin for housing the spring.

3. A pin safety catch comprising a pin having diametrically-opposed and longitudinally-extending recesses with a bore connecting the ends of the recesses for forming a U-shaped recess, a U-shaped spring placed in the recess and having its legs bent for extending at an angle to the pin when the legs are freed, and a sleeve slidable on the pin for housing the spring, the free end of the sleeve being closed and pointed.

4. A pin safety catch comprising a pin having diametrically-opposed and longitudinally-extending recesses with a bore connecting the ends of the recesses for forming a U-shaped recess, a U-shaped spring placed in the recess and having its legs bent for extending at an angle to the pin when the legs are freed, a sleeve slidable on the pin for housing the spring, and means for limiting the movement of the sleeve with respect to the pin.

GEORGE RODNEY MONKS.